March 22, 1960 R. L. DOAN 2,929,469
AUTOMATIC TRANSMISSION ATTACHMENT
Filed July 30, 1957 2 Sheets-Sheet 2

Roscoe L. Doan
*INVENTOR.*

BY *Clarence A. O'Brien
and Harvey B. Jacobson*
*Attorneys*

United States Patent Office 2,929,469
Patented Mar. 22, 1960

2,929,469

AUTOMATIC TRANSMISSION ATTACHMENT

Roscoe L. Doan, Chandler, Ariz.

Application July 30, 1957, Serial No. 675,227

2 Claims. (Cl. 184—105)

This invention relates in general to new and useful improvements in automatic transmissions, and more specifically to an improved attachment for vehicle automatic transmissions.

All automatic transmissions which are now in use in automobiles utilize a fluid coupling in the operation thereof. While the automatic transmissions are built with suitable seals and there is no leakage of the fluid of the transmission during initial operation, after a period of use, the seals become worn and as a result there is a tendency for the fluid to leak past the seals. Although the seals are relatively inexpensive, because of their position, it is necessary to first remove the automatic transmission from the vehicle and then partially disassemble it in order to replace the seal. Thus when a seal becomes worn, a relatively expensive repair job is necessitated. Also, in many instances there is a wear on the shaft which turns in the seal and in order to obtain a proper seal with a new seal, it is necessary to replace or repair the shaft.

It is therefore the primary object of this invention to provide a simple attachment which may be connected to an automatic transmission and which will provide an effective seal in existing transmissions so as to prevent the leakage of fluid past the usual seals even after the usual seals have become worn.

Another object of this invention is to provide an improved attachment for automatic transmissions, the attachment being in the form of means for producing a vacuum within a transmission so that the vacuum in itself will prevent the normal flow of the fluid of the transmission out past the worn seals thereof.

Another object of this invention is to provide an improved vacuum seal attachment for automatic transmissions which will supplement existing seals whereby loss of fluid past worn existing seals is prevented, the attachment being of such a nature whereby it may be mounted on either new or existing vehicles with a minimum of expense and labor.

A further object of this invention is to provide an improved sealing device for automatic transmissions, the sealing device being in the form of a vacuum coupling for producing a vacuum within the automatic transmission housing whereby the pressure within the automatic transmission housing is below that of the atmosphere and thus normal flow of the fluid through the seals is eliminated, the device including means for controlling the vacuum produced and for returning oil to the transmission should such oil be drawn therefrom in the vacuum forming process.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6 is an enlarged exploded perspective view of the vacuum control device and shows the specific details of each and every component thereof; and Figure 7 is an enlarged fragmentary perspective view of a modified form of coupling to an automatic transmission.

Figure 1:
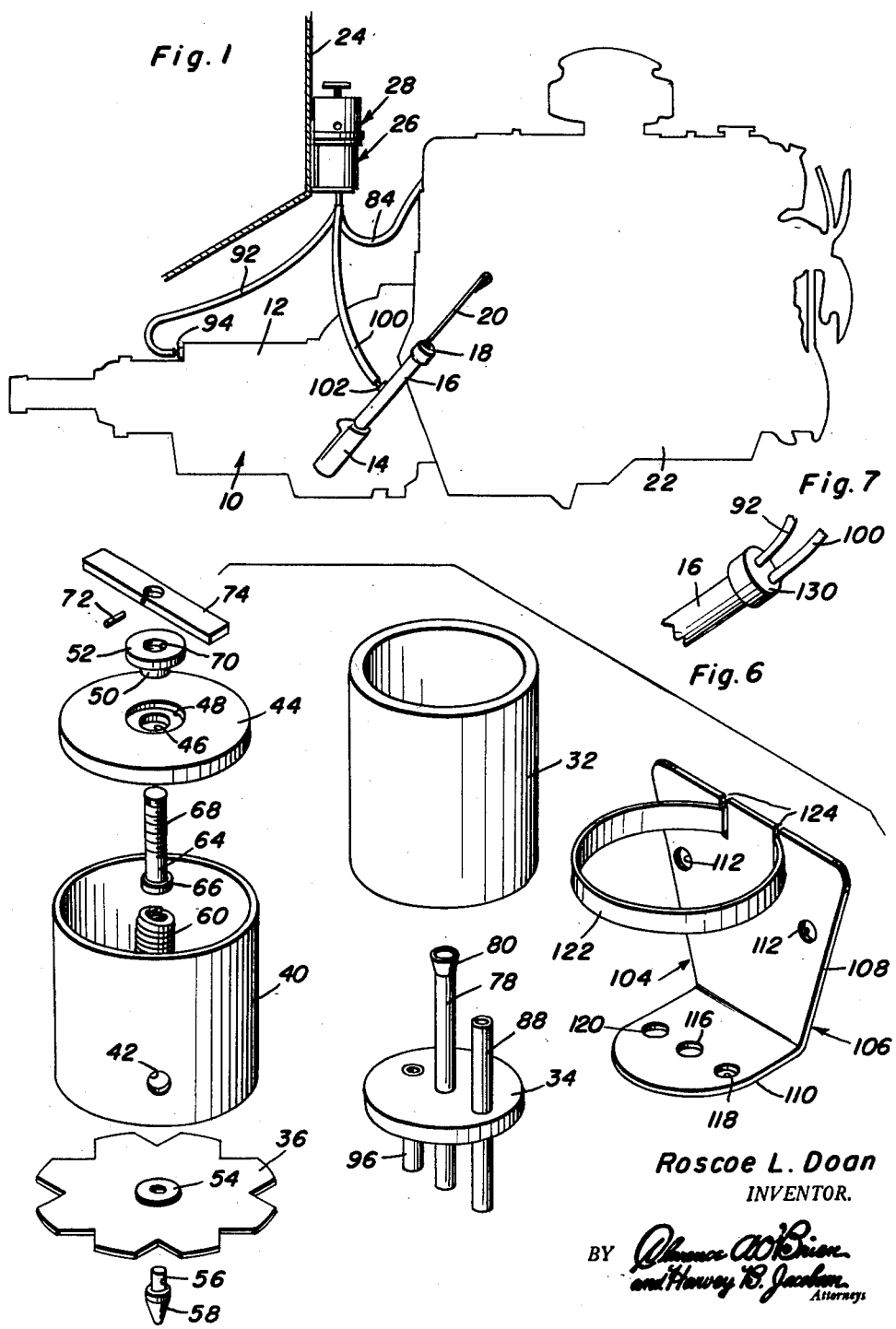
Figure 1 is a schematic view of a conventional automatic transmission assembly and including a vehicle engine and firewall and shows connected to the automatic transmission the attachment which is the subject of this invention.

Referring now to the drawings in detail, it will be seen that there is illustrated a conventional type of automatic transmission which is referred to in general by the reference numeral 10. The transmission 10 includes a housing 12 which has extending upwardly from one side thereof adjacent the forward end thereof a filler pipe 14. The filler pipe 14 includes an extension 16. The extension 16 has the upper end thereof normally closed by a cap 18 which carries a dip stick 20 for determining the level of the hydraulic fluid or oil within the housing 12.

The automatic transmission 10 is illustrated in a typical installation connected to an automobile engine 22. The firewall 24 of the automobile is also illustrated. Mounted on the firewall 24 and coupled to the automatic transmission 10 and the engine 22 are components of the attachment which is the subject of this invention, the attachment being referred to in general by the reference numeral 26.

Figure 2:
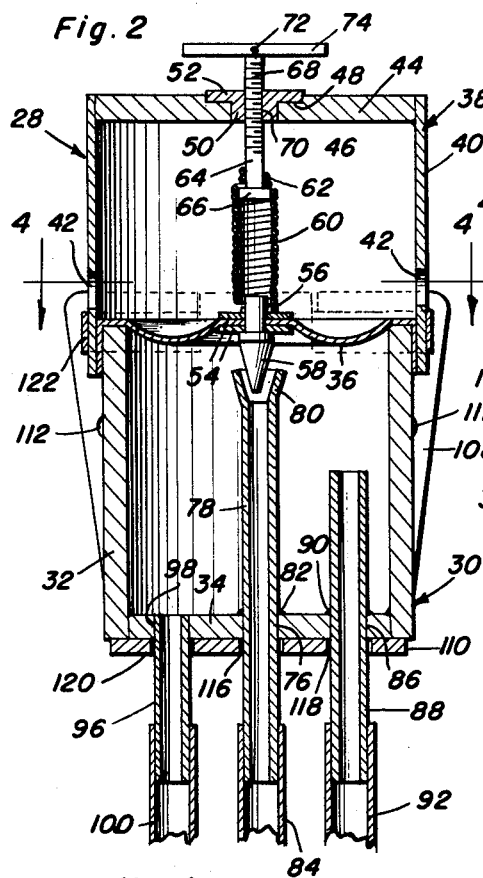
Figure 2 is an enlarged fragmentary vertical sectional view taken through a vacuum control device of the attachment and shows the specific details thereof.
Figure 3:
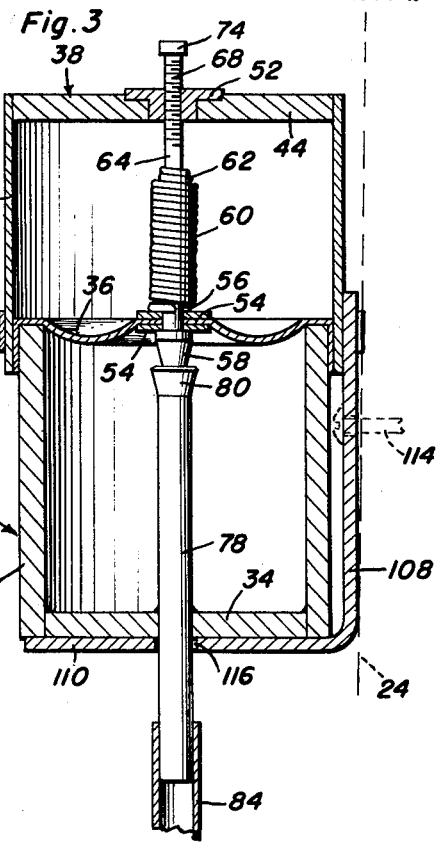
Figure 3 is an enlarged fragmentary longitudinal sectional view taken through the vacuum control device and shows further the details thereof, the mounting bracket for the vacuum control device being shown in the relationship thereof with respect to a vehicle firewall being shown in dotted lines.
Figure 4:
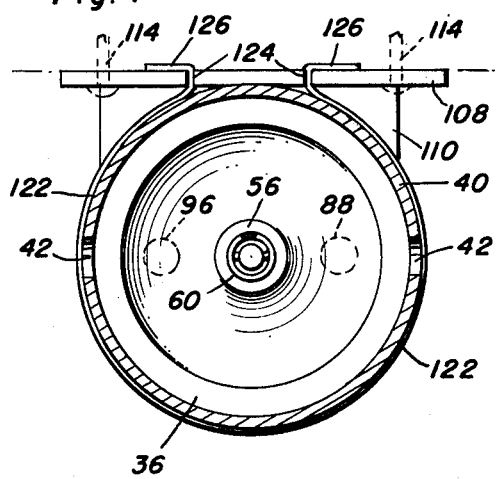
Figure 4 is an enlarged fragmentary transverse sectional view taken substantially upon the plane indicated by the section line 4—4 of Figure 2 and shows further the details of the mounting bracket for the vacuum control device.
Figure 5:
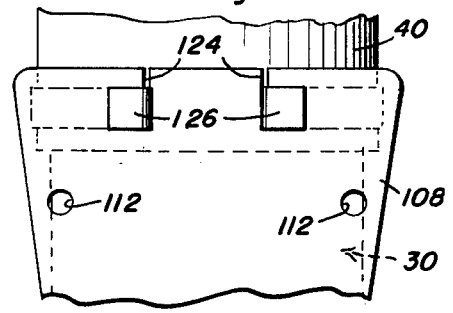
Figure 5 is an enlarged fragmentary rear elevational view of the vacuum control device and its mounting bracket and shows the manner in which a retaining ring is locked to a mounting plate of the mounting bracket.

The attachment 26 includes primarily a vacuum control device which is referred to in general by the reference numeral 28. As is best shown in Figures 2, 3 and 6, the vacuum control device 28 includes a housing 30 which is formed of a cylindrical body member 32 and a bottom wall 34. The upper end of the housing 30 is closed by a diaphragm 36. The diaphragm 36 is sealed to the upper edge of the body member 32 by means of a cap which is referred to in general by the reference numeral 38.

The cap 38 includes a cylindrical body member 40 whose lower end is telescoped over the upper end of the body member 32 and which clamps in place peripheral portions of the diaphragm 36 to form a seal between the diaphragm 36 and the upper end of the body member 32. The body member 40 is provided with suitable depth openings 42 in the lower part thereof to permit the free flexing of the diaphragm 36 within the cap 38.

The cap 38 also includes a top wall 44 which is relatively thick and which has formed therein a centrally located bore 46. Surrounding the bore 46 is a seat 48 formed in the upper part of the top wall 44. Projecting down into the bore 46 is a reduced portion 50 of a bushing member 52. The bushing member 52 is seated on the seat 48.

The central portion of the diaphragm 36 is reinforced by a pair of plates 54 disposed on opposite sides thereof. Extending through the plates 54 and the diaphragm 36 is a shank 56 of a valve member 58. The shank 56 is suitably secured to the plates 54 whereby the valve member 58 moves upwardly and downwardly with the diaphragm 36. The diaphragm 36 is spring loaded for upward movement by means of a spring 60 which is connected to the uppermost one of the plates 54. The spring 60 has a reduced upper portion 62 which surrounds the lower portion of a bolt 64. The bolt 64 has an enlarged lower end 66 which is confined within the spring 60 and prevents downward movement of the upper end of the spring 60. The bolt 64 includes an externally threaded shank portion 68 which is threadedly engaged in an internally threaded bore 70 through the bushing 52. Secured to the upper end of the bolt 64 by means of a pin 72 is a control handle 74. By turning the control handle 74, the bolt 64 may be fed up or down, as is desired, to control the tension of the spring 60.

Extending through a central bore 76 and the bottom wall 34 is a main vacuum tube 78. The upper end of the main vacuum tube 78 terminates adjacent the diaphragm 36 and is flared outwardly to form a valve seat 80. It is to be noted that the valve member 58 is of a conical outline so as to cooperate with the valve seat 80. The main vacuum tube 78 is secured to and sealed to the bottom wall 34 by suitable securing means such as welding or soldering 82.

Connected to the lower end of the main vacuum tube 78 is a first vacuum line 84. The first vacuum line 84 is provided at the opposite end thereof with a suitable coupling which may be attached either to the intake manifold or a vacuum producing pump of the internal combustion engine 22.

Offset from the bore 76 is a second bore 86 formed in the bottom wall 34. Extending through the bore 86 is a second vacuum tube 88. The vacuum tube 88 extends substantially half of the height of the housing 30 and is sealed with respect to the bottom wall 34 by suitable securing means, such as soldering or welding 90.

Connected to that end of the second vacuum tube 88 which extends below the housing 30 is a second vacuum line 92. The vacuum line 92 is provided at the opposite end thereof with a fitting 94 for connection to the interior of the housing 12. On certain models of transmissions, the housing 12 may be provided with an internally threaded bore for receiving the fitting 94. On other models of transmissions, it may be necessary to specially produce such an internally threaded bore.

During the operation of the internal combustion engine 22, a vacuum will be produced within the housing 30 due to the provision of the vacuum line 84. This vacuum will be controlled by a valve assembly including the valve 58. Inasmuch as the vacuum line 92 also opens into the housing 30, a vacuum will be produced in the vacuum line 92. Since the opposite end of the vacuum line 92 is communicated with the interior of the transmission housing 12, it will be seen that a vacuum will be produced within the transmission housing 12. Since the pressure within the transmission housing 12 is less than that of the atmosphere, it will be seen that there is a tendency for the fluid of the transmission to be retained therein. Thus should the seals of the transmission become worn, the vacuum produced within the housing 12 will still prevent the flow of the fluid past the seals.

Inasmuch as the vapor removed from the transmission housing 12 will contain a certain amount of the fluid of the transmission 10, which fluid it is desired to retain, there is providde an oil or fluid return tube 96. The tube 96 extends through an opening 98 formed in the bottom wall 34 of the housing 30. It is to be noted that the upper end of the tube 96 terminates substantially flush with the upper surface of the bottom wall 34 to assure the drainage of any fluid passing into the housing 30 down through the tube 96.

Connected to the lower end of the tube 96 is an oil return line 100. The oil return line 100 is provided at the opposite end thereof with a fitting 102 which is in turn connected to the extension 16 of the filler pipe 14. Thus the fluid or oil which is removed from the transmission housing 12 through the second vacuum line 92 will be returned to the transmission housing 12 through the filler tube extension 16.

In order to facilitate the mounting of the vacuum control device 28 on the firewall 24, there is provided a mounting bracket assembly which is referred to in general by the reference 104. The mounting bracket assembly 104 includes a mounting bracket 106 which is angular in outline and which includes a vertical part 108 and a horizontal part 110. The vertical part 108 is provided with a plurality of openings 112 through which fasteners 114 pass so as to secure the mounting bracket 106 to the firewall 24.

It is to be noted that the housing 30 seats directly upon the horizontal part 110. In order to provide for the passage of the tube 78, 88 and 96, there is provided a series of openings which includes a central opening 116 for the tube 78, a right hand opening 118 for the tube 88, and a left hand opening 120 for the tube 96. It is to be understood that the tubes 78, 88 and 96 may be passed out through their respective openings prior to the connection of the various lines thereto.

In order that the vacuum control device 28 may be retained on the mounting bracket 106, the mounting bracket assembly 104 also includes a retaining ring 122. The retaining ring 122 passes around the lower end of the body part 40 of the cap 38. It is to be noted that the upper edge of the vertical part 108 has opening therethrough a pair of transversely spaced slots 124. Extending through the slots 124 are ends of the retaining ring 122. It is to be noted that the ends of the retaining ring 122 are referred to by the reference numeral 126 and are bent over behind the vertical part 108. Inasmuch as the vertical part 108 is clamped against the firewall 24, accidental release of the retaining ring 122 is prevented.

From the foregoing description of the attachment 26, it will be readily apparent that it may be easily mounted on either existing vehicles or newly produced vehicles. Also, it is to be noted that the connections for the attachment are very simple ones and will require a minimum of expenditure and labor.

It is to be understood that the attachment 26 will not be required when the automatic transmission 10 is new. However, as the seals thereof become worn, the requirement for the attachment 26 will increase. Initially the valve 58 may be in a closed position, if it is so desired although it is suggested that a slight vacuum be produced within the transmission housing 12 at all times to assure against any accidental leaks. As the seals become worn, the valve member 58 may be adjusted to increase the vacuum within the transmission housing 12 to compensate for the wear on the seal. The vacuum may be increased within the transmission housing as is desired within the practical limits of the invention.

During the operation of an internal combustion engine of a vehicle, such as the internal combustion engine 22, the vacuum produced in the intake manifold or by a vacuum producing pump will vary depending upon the engine operating conditions. However, for the purposes of the present invention, it is desirable that the vacuum within the automatic transmission can be maintained at a predetermined maximum. This is accomplished by means of the diaphragm 36 and the valve member 58. Since the cap 38 is vented it will be readily apparent that when a vacuum exists within the body member 32, the diaphragm 36 will be urged downwardly against the tension spring 60. When this downward force becomes greater than the upward force of spring 60, the diaphragm 36 will force the valve member 58 into a seated or closed position on the valve seat 80. The valve member 58 will, of course, return to an open position upon a reduction of the vacuum in the body member 32. The result is that the diaphragm 36 cooperates with the spring 60 and the valve member 58 in the valve seat 80 to provide control of the pressure in the body member 32 and within the automatic transmission 10.

On certain models of automatic transmissions, it will be undesirable to connect the second vacuum line 92 to the transmission housing 12 at the point indicated by the fitting 94 in Figure 1. This is particularly true on certain present installations where the attachment would be attached to existing vehicles. This has been overcome by providing a special closure cap 130 which will replace the closure cap 18. The closure cap 130 will have connected thereto both the vacuum line 92 and the oil return line 100. If desired, the underside of the cap 130 may have projecting downwardly therefrom a dip stick similar to the dip stick 20.

From the foregoing description of the present invention, it will be readily apparent that while the invention is very simple in construction and operation, it produces a need which now exists in present day vehicles and will avoid many costly repair jobs on automatic transmissions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A pressure relieving and vacuum producing attachment for automatic transmissions comprising a vacuum control device including a housing, a first vacuum line connected to said vacuum control device, means on said first vacuum line for connecting said first vacuum line to a vehicle vacuum source, a second vacuum line connected to said vacuum control device, means on said second vacuum line for connecting said second vacuum line to the interior of the automatic transmission, said vacuum control device including a vacuum tube opening into said housing and connected to said first vacuum line, a valve cooperating with said first vacuum tube to control the vacuum produced in said housing, said valve including a valve seat formed in said vacuum tube, a diaphragm closing the upper end of said housing, and a valve member carried by said diaphragm cooperating with said valve seat.

2. A pressure relieving and vacuum producing attachment for automatic transmissions comprising a vacuum control device including a housing, a first vacuum line connected to said vacuum control device, means on said first vacuum line for connecting said first vacuum line to a vehicle vacuum source, a second vacuum line connected to said vacuum control device, means on said second vacuum line for connecting said second vacuum line to the interior of the automatic transmission, said vacuum control device including a vacuum tube opening into said housing and connected to said first vacuum line, a valve cooperating with said vacuum tube to control the vacuum produced in said housing, said valve including a valve seat formed in said vacuum tube, a diaphragm closing the upper end of said housing, and a valve member carried by said diaphragm cooperating with said valve seat, adjustable spring loading means connected to said diaphragm.

References Cited in the file of this patent

UNITED STATES PATENTS

| | | |
|---|---|---|
| 1,428,017 | Edwards | Sept. 5, 1922 |
| 2,856,026 | Wahmann | Oct. 14, 1958 |